Oct. 27, 1925.

C. R. ST. JOHN 1,558,568

LAWN CLIPPER

Filed Sept. 11, 1922

2 Sheets-Sheet 1

Inventor:
Cyrus R. St. John
By Robert W. Randle
Attorney.

Oct. 27, 1925.

C. R. ST. JOHN 1,558,568

LAWN CLIPPER

Filed Sept. 11, 1922     2 Sheets-Sheet 2

Inventor:
Cyrus R. St. John
By Robert W. Randle
Attorney

Patented Oct. 27, 1925.

1,558,568

UNITED STATES PATENT OFFICE.

CYRUS R. ST. JOHN, OF RICHMOND, INDIANA, ASSIGNOR OF ONE-HALF TO RAYMOND H. SMITH, OF RICHMOND, INDIANA.

LAWN CLIPPER.

Application filed September 11, 1922. Serial No. 587,549.

*To all whom it may concern:*

Be it known that I, CYRUS R. ST. JOHN, a citizen of the United States, residing near the city of Richmond, in the county of Wayne, State of Indiana, have invented new and useful Improvements in Lawn Clippers, of which the following is a full, clear, and comprehensive specification and exposition, the same being such as will enable others to make and use the same with absolute exactitude.

The object of my present invention, broadly speaking, is to provide a lawn clipper which is simple in construction, efficient in practice, easily operated and controlled, and which can be manufactured and sold at a comparatively low price.

It is well known that weeds and plants grow up in lawns faster or taller than does the grass, and then by reason of their height they are mashed down by the ordinary lawn mower rather than cut off and destroyed, therefore to provide a machine which will effectually cut weeds and plants and even grass without mashing them down and regardless of their height, is the predominant object of this invention.

However it is to be understood that this invention is not to be limited to cutting weeds or to use upon lawns, but it may be employed for various other purposes and in any place where it may be found to be applicable.

And various other uses may be found for the machine other than that herein mentioned.

Figure 1:
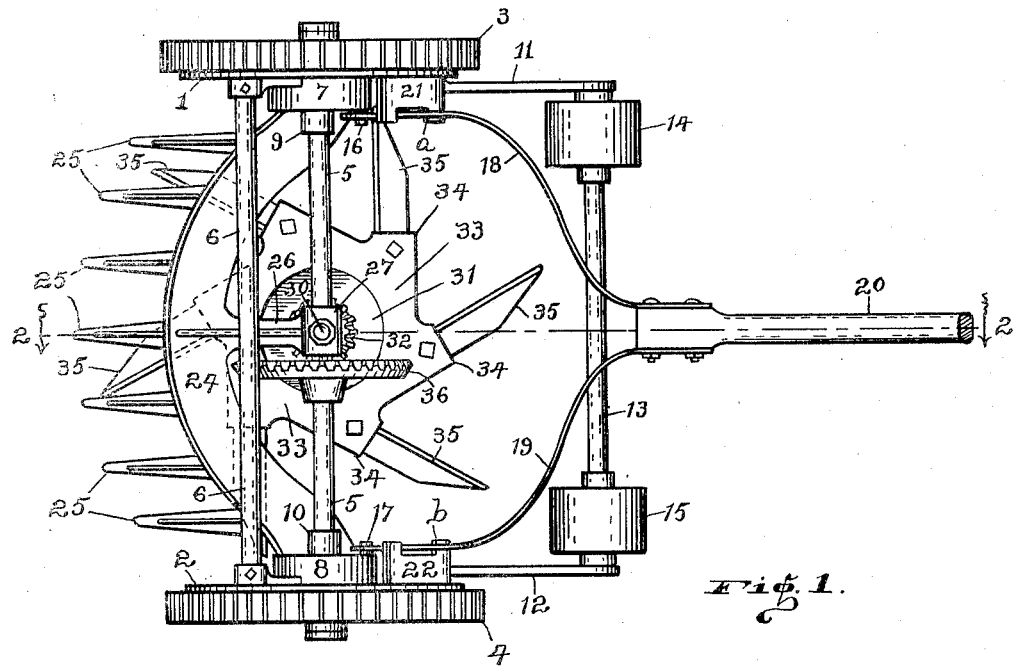
Figure 2:
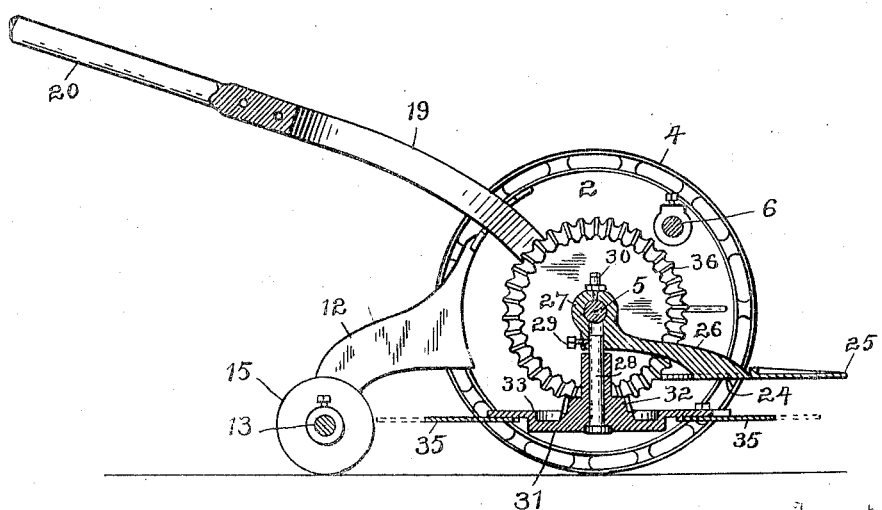
Figure 3:
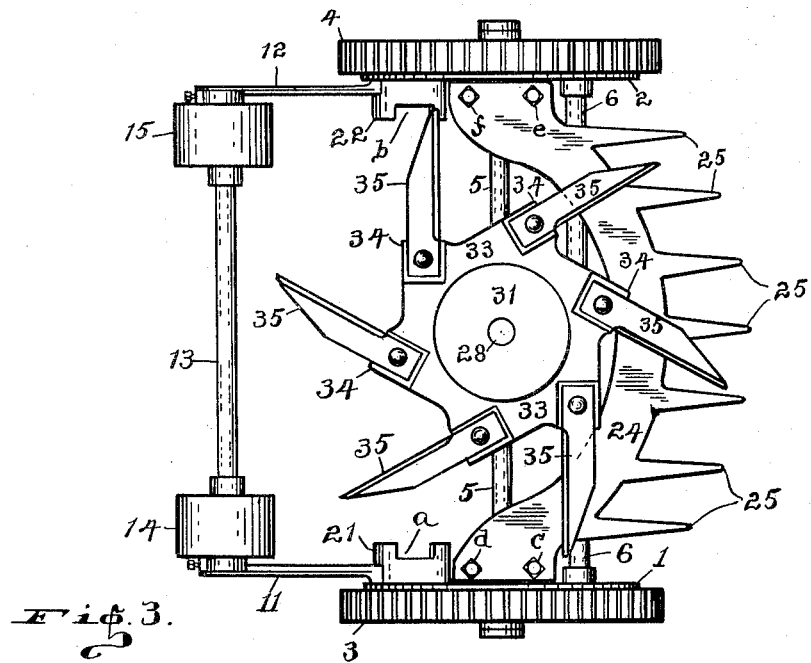
Figure 4:
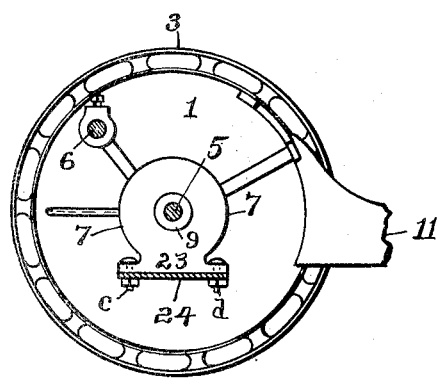

The preferred means for carrying out the principles of my invention in a practical and efficient manner is shown in the accompanying drawings, in which—Figure 1 is a top plan view of the machine complete. Figure 2 is sectional view of the machine, as taken on the line 2—2 of Fig. 1. Figure 3 is a bottom or underside plan view of the machine. And Figure 4 is an inside face elevation, partly in section, of one end of the machine.

Similar indices denote like parts throughout the several views.

In order that the construction, the operation, and the advantages of my invention may be more fully understood and appreciated, I will now take up a detailed description thereof in which I will set forth the construction as fully and as clearly as I may.

The frame of my machine comprises the two end discs 1 and 2, around which revolve the main ground wheels 3 and 4, respectively. The discs 1 and 2 are spaced apart and are connected by the main shaft 5 which revolves in the discs 1 and 2 and is concentric therewith.

The discs 1 and 2 are rigidly connected in spaced relation to each other by the stay shaft 6, as shown.

Formed integral with the inner faces of the respective discs 1 and 2, and concentric thereof, are the inwardly extending housings 7 and 8 which surround the shaft 5 and are concentric therewith, and integral with the respective housings are the bearings or boxings 9 and 10 for the shaft 5, which revolves therein.

Integral with the respective discs 1 and 2 and extending rearward therefrom are the arms 11 and 12 which are identical with each other, and their rear portions are connected by the shaft 13. Ground rollers 14 and 15 are revolvably mounted on the shaft 13.

Extending inward from the faces of the respective housings 7 and 8 are the lugs 16 and 17 which are adapted to fit in apertures in the forward ends of the respective handle-prongs 18 and 19. Said prongs extend inward and rearward and are rigidly secured to the handle 20 common to both.

Extending inward from near the outer edge of the discs 1 and 2 are the respective flanges 21 and 22, in each of which is a notch, as the respective notches *a* and *b*, through which the respective arms extend as shown.

Formed integral with the lower side of the respective housings 7 and 8 are heads, as the head 23 shown in Fig. 4. Said heads have lower downwardly directed faces, and a pair of bolts: *c—d* and *e—f* respectively extend through the said heads on the respective sides, as shown in Fig. 3.

Numeral 24 denotes the guard-bar, which is located horizontally but it curves forwardly forming a crescent, as shown in Figs. 1 and 3. The ends of the bar 24 contact with the said faces of the heads 23, with which they correspond, and to which they are rigidly secured by said bolts *c—d* and *e—f*, as is clearly indicated.

Said bar 24 has a plurality of forwardly extending guards or teeth 25 integral therewith, for the purpose hereinafter stated. Extending upward and rearward from the central portion of the bar 24 is an arm 26, carrying a horizontal bearing 27 and a vertically disposed socket.

The bearing 27 forms a central support for the shaft 5 which extends horizontally therethrough. Also a vertical shaft 28 extends up into the socket underneath the bearing 27 where it is secured. Said shaft 28 is held rigidly in place by the set-screw 29, and the lower end of the shaft 28 terminates in a flat head, as shown in Figs. 2 and 3, for the purpose herein made apparent.

Numeral 30 denotes the oil cup from which oil may flow to the central bearing of the shaft 5 and from there down to and around the shaft 28, for the purpose hereinafter made apparent.

The revolvable cutter wheel consists of a central disc 31, having concentric thereof and extending up therefrom the pinion 32, and extending out radially from the disc 31 is the flange 33 whose periphery forms a plurality of right-angular shoulders 34.

Rigidly secured to and extending out from each of said shoulders is a blade 35. Said blades are disposed horizontally and each is disposed at an acute angle with relation to the diameter of the disc 31, and they are all located some distance below the bar 24 and the teeth 25, as indicated in Fig. 2. Secured on the shaft 5 is the bevel gear wheel 36 which meshes at right-angles with the pinion 32.

Modus operandi: It will now be seen that the machine may be pushed over the ground by a person holding the handle 20, the ground wheels 3 and 4 turning and carrying revolvably therewith the shaft 5. The revolving of the shaft 5, carrying the gear-wheel 36, the latter meshing with the pinion 32, will manifestly cause the cutter wheel to revolve at a comparatively high rate of speed which will cause the sharp edges of the blades 35 to engage whatever is in the path of the operation of the machine, which we will assume to be weeds. Now as the teeth 25 are in advance of the blades 35 it will be seen that the standing weeds will be located between the teeth when the blades strike them, thereby preventing the weeds from being bent over and assuring them being severed by the blades coming into contact therewith. The ground wheels 3 and 4 and the rollers 14 and 15 assure that the machine will be carried over the ground in substantially horizontal position; and the usual ratchets (not shown) located between the wheels 3 and 4 and the discs 1 and 2 allow the machine to be moved rearward without turning the cutter wheel. This machine has been found to be especially applicable in going over lawns for cutting dandelions, buckhorns, plantain, and various other weeds and plants, such plants being cut comparatively high from the ground, after which the lawn may be gone over with an ordinary lawn-mower in the usual manner.

I desire that it be understood that various changes may be made in the several details of construction herein shown without departing from the spirit of the invention and without sacrificing any of the advantages thereof which are new and useful.

Having now fully shown and described my invention, what I claim and desire to secure by Letters Patent of the United States, is—

1. A lawn clipper comprising end-discs, means for rigidly connecting said discs in spaced relation to each other, a ground wheel surrounding each of said discs, a shaft connecting said wheels, a guard bar connecting said discs, teeth extending forward from said bar, an arm extending rearwardly from the center of said bar, a bearing carried by said arm and affording a central bearing for said shaft, a vertical shaft, means for securing the upper end of said vertical shaft to said arm, a cutter wheel revolvably mounted on the vertical shaft, blades radiating from the cutter wheel, ground rollers for supporting the rear end of the machine, and means whereby the machine may be propelled manually.

2. A lawn clipper comprising end-discs, means for rigidly connecting said end discs in spaced relation to each other, ground-wheels surrounding said end-discs, a horizontal shaft connecting said wheels, a guard-bar connecting said end discs, an arm extending rearward from the center of said bar, a bearing carried by said arm and forming a central bearing for said shaft, a vertical stationary shaft whose upper end is rigidly secured to said arm, a head formed on the lower end of the vertical shaft, a cutter wheel disc revolvably mounted on the vertical shaft and supported by said head, flanges radiating from the cutter wheel disc and forming a plurality of right-angular shoulders, a blade secured to each of said shoulders, a bevel gear secured on the horizontal shaft, a pinion formed integral with said cutter wheel disc and located in mesh with said bevel gear, all substantially as set forth.

CYRUS R. ST. JOHN.